July 28, 1936.  J. HALTENBERGER  2,048,862
FENDER ACCESSORY
Filed Dec. 22, 1933    2 Sheets-Sheet 1
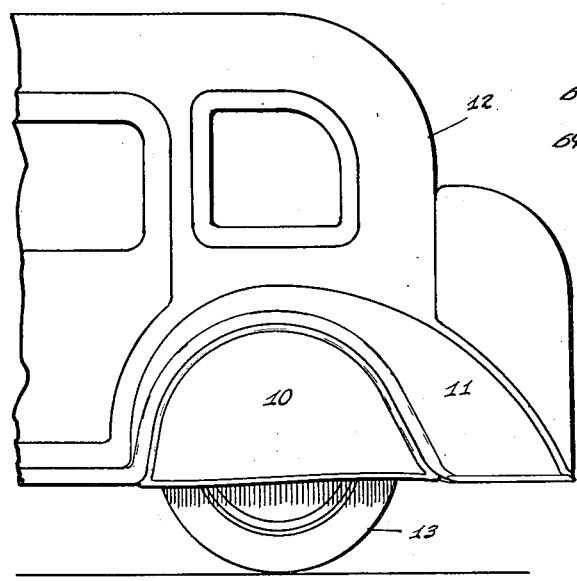
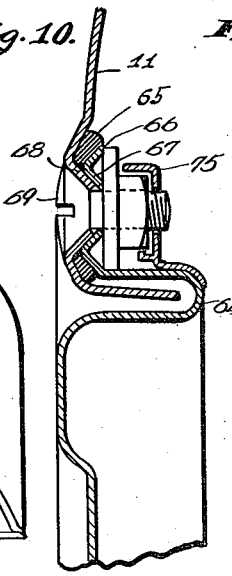
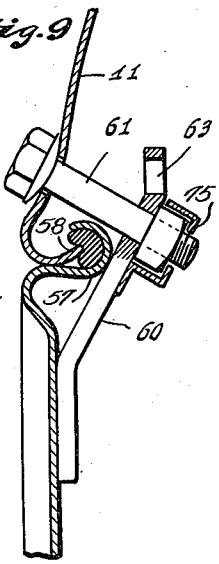
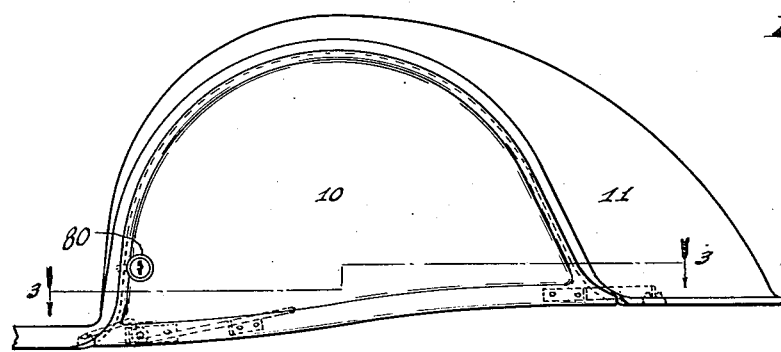
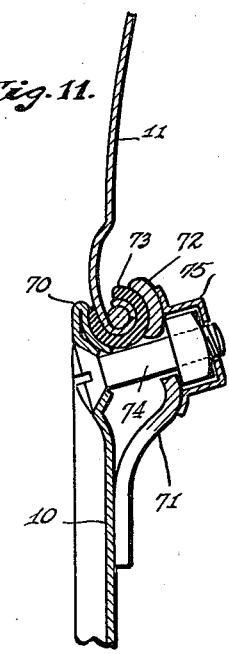
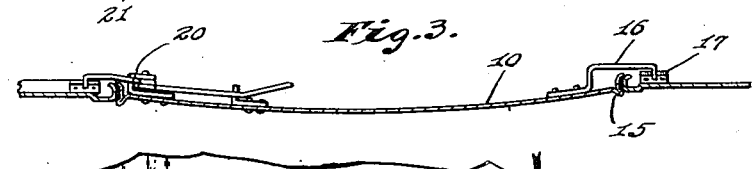
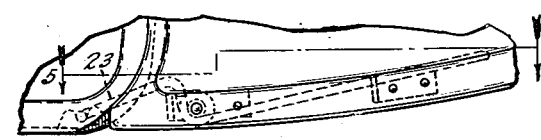
Inventor
JULES HALTENBERGER,
By Schley & Trask
Attorneys July 28, 1936.  J. HALTENBERGER  2,048,862
FENDER ACCESSORY
Filed Dec. 22, 1933   2 Sheets-Sheet 2
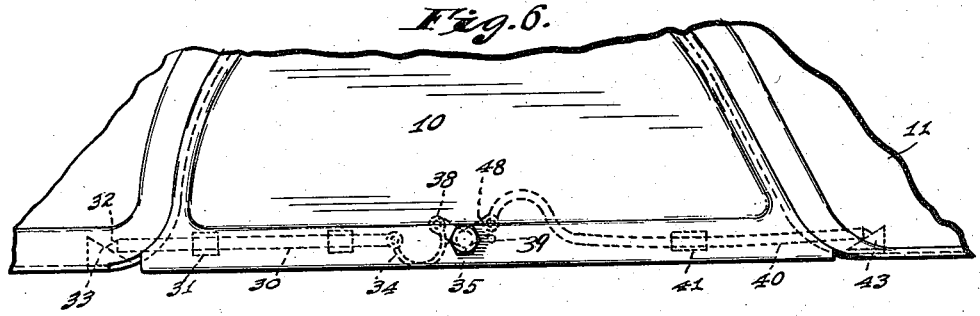
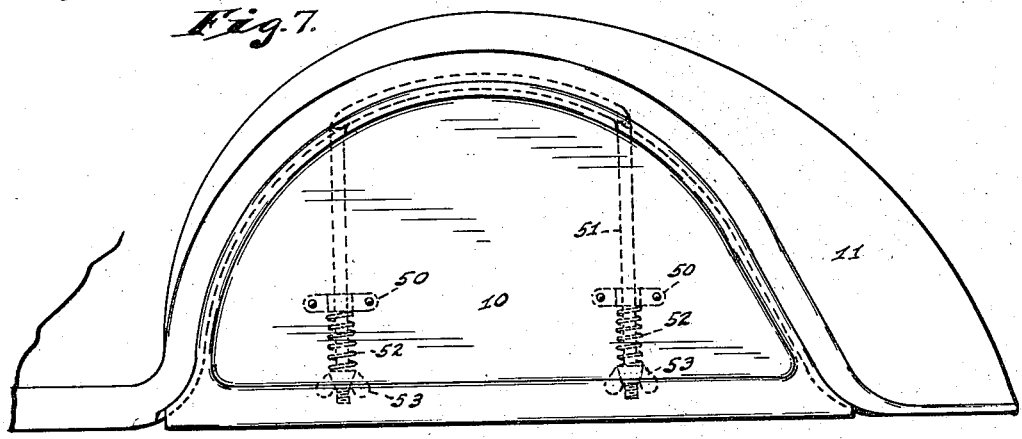
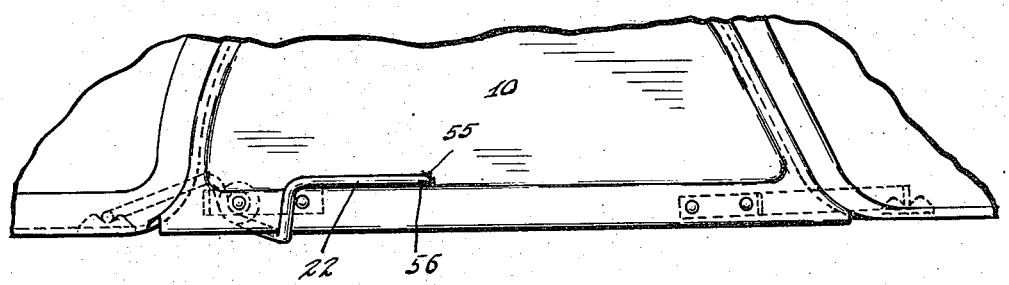
Inventor
JULES HALTENBERGER, Patented July 28, 1936

2,048,862

UNITED STATES PATENT OFFICE 2,048,862

FENDER ACCESSORY

Jules Haltenberger, Indianapolis, Ind.

Application December 22, 1933, Serial No. 703,562

15 Claims. (Cl. 280—153)

REISSUED

This invention relates to an automobile construction, and particularly to an accessory for enclosing the wheel-exposing opening of a fender.

It is the object of my invention to improve the stream lines and decrease the wind resistance of an automobile, to improve the appearance of the automobile, and to brace the depending edges of a wheel-fender, especially a deep-skirted fender. It is a further object of my invention to provide for mounting an accessory on a fender in a manner which will permit ready and simple removal and replacement, which will avoid the occurrence of rattles or other noises and which will co-operate with the fender parts to strengthen and brace them. It is a further object of my invention to provide a closure for a fender wheel-exposing opening which when in place will prevent the removal of the wheel or its tire, and which may be locked in place, so as to prevent unauthorized removal of the wheel or tire.

In the construction of wheel fenders for automobiles, it is necessary to leave an opening which will expose the wheel and permit access to it for the purposes of repair and changing of tires. In the present day automobile, of so called stream-line design, the laterally extending portions of the fenders are spaced considerable distances from the wheels, and the fender skirts extend toward the wheel axes to leave wheel exposing openings only slightly larger than the wheels. It is to these deep-skirted fenders that my invention is especially applicable, for in them the fender-edges which define the wheel-exposing opening are relatively unsupported by the inherent fender design.

In accomplishing the objects of my invention, I provide a shield or closure which will fill the wheel-exposing opening of fender and make the outside surfaces of the fender substantially continuous. This closure has at its edges means which co-operate with the fender edges to avoid relative movement therebetween.

The closure or shield is desirably secured in place by some device which will permit ready removal and replacement, in order to permit ready access to the wheel. This securing means may take various forms, but preferably I provide the upper edges of the closure with an outwardly open channel of a size adapted to receive within its side walls the edges of the fender; so that mounting of the closure is accomplished by moving such closure upward into engagement with such fender edges. With the channel embracing the fender edges on both sides, the closure may be held in place by some means which merely prevents it from moving downwardly. Preferably, this means includes a spring which is under stress when the closure is secured in place and the stress-reaction of which tends to urge the closure upwardly to effect closer embrace between the channel and fender edges. The means which secures the closure in place may have associated with it a key-operated lock for preventing its unauthorized operation, or conveniently, the closure may be provided with a separate key-operated lock which prevents its removal.

In the preferred form the shield is held at one end by a fixed arm in position to engage a keeper supported by the fender; and at the other end by a spring lever pivoted at its center and having one arm which enggages a fender-supported keeper and a second arm which can be moved to stress the spring and into engagement with a holder on the shield. The closure or shield will thus be held at one lower corner by a rigid arm and at the other lower corner by a spring whose stress-reaction tends to urge the closure upwardly.

Other means of securing the closure will be apparent from the drawings and the following description.

The accompanying drawings illustrate my invention: Fig. 1 is a side elevation of the rear portion of an automobile, showing a fender with one of my closures in place; Fig. 2 is a similar side elevation showing the closure in association with a fender and also showing details of a preferred form of mounting the shield; Fig. 3 is a section view taken on the line 3—3 of Fig. 2; and showing the sectional shape of the closure; Fig. 4 is an enlarged fragmentary view of the left-hand corner of the closure shown in Fig. 2; Fig. 5 is a section taken on the line 5—5 of Fig. 4; Figs. 6, 7, and 8 are elevations of closures having modified forms of locking mechanisms; and Figs. 9, 10, and 11 are sections taken across the meeting edges of the shield and fender and showing modifications in which such edges are secured together to hold the shield in place.

While for illustrative purposes the drawings show my shield only in association with a rear fender, it will be clear that similar shields may be mounted on front fenders.

In Fig. 1 of the drawings I have shown a shield 10 associated with a deep skirted fender 11 on the rear portion of an automobile 12. It is to be noted that the shield 10 extends downwardly below the axle of the wheel 13. For this reason, and for the purpose of strengthening the shield, and making it conform to the curved lines of the automobile, the shield is dished outwardly as is shown in Fig. 3.

As is shown in Figs. 1 and 2, the wheel-exposing opening in the fender is of generally semicircular form so that its edges diverge downwardly. The shield 10 is of a similar form, and its edges are shaped to provide an outwardly opening channel 15 which may be brought into embracing engagement with the fender edges which define the wheel-exposing opening, by upward movement of the shield in the plane of such fender edges. This channel is preferably formed integral with the shield, as by rolling its edge so that it extends back upon itself, then laterally, and then upwardly. The channel will thus have a front wall of double thickness and a bottom and back wall of single thickness, as is shown in Figs. 3 and 5; and the bottom will be spaced inwardly from the extreme edge of the shield. This construction avoids the necessity of marring the shield surface by securing to it any supplementary parts at its edges. Desirably, the bottom of the channel is lined with some soft material such as rubber or felt, to seal the joint between the shield 10 and the fender 11 and to compensate for any irregularities in the mating edges of such two parts.

When the shield is thus provided at its edges with means which prevents its lateral displacement from the edges of the fender, it may be secured in place by merely holding it against downward movement. Preferably, this is accomplished at one lower corner of the shield by means of a rigid arm 16 secured to the shield 10 and projecting outwardly therefrom into engagement with a fender-supported keeper 17. At the other lower corner of the shield is mounted a U-shaped bracket 20, and in such bracket is journaled a spring lever. This spring lever is in the form of a spring bar which is wound intermediate its ends into a coil 21 of a few turns, so that the lever consists of a handle 22, the coil 21, and a latch arm 23. The coil 21 conveniently forms the bearing by which the spring lever is journaled. The latch arm 23 extends outwardly beyond the edges of the shield 10, and has its end bent over to form a latch finger 24 in position to co-operate with a keeper 25 supported by the fender. A handle-retaining bracket 26 is provided at a point spaced from the U-bracket 20 toward the opposite lower corner of the shield 10.

With this arrangement, the fender shield may be inserted in the wheel-exposing opening of the fender by first bringing the arm 16 into engagement with its keeper 17; and then, pivoting the shield about their point of contact, the latch finger 24 is brought into engagement with its keeper 25 and the handle 22 rotated upwardly in a counterclockwise direction and hooked over the holder 26, into the position shown in Figs. 2 to 5 inclusive.

While in this preferred form of my shield, I have shown only a single spring lever 22—23, a second spring lever may readily be used in place of the fixed arm 16.

If the fixed arm and a single spring are used, the shield may conveniently be locked in place to prevent unauthorized removal by providing a key-operated lock 80 just above the spring lever 22—23 and having a bolt which when in locked position passes through alined holes in the fender bead and the channel bottom. This lock is preferably of the cylinder type and may be operable by the same key as the door, ignition, or spare-wheel lock of the automobile.

If either one or two spring levers are used, it is to be noted that the shield is held upwardly by the stress-reaction of a spring, and the channel 15 is thus continuously urged into closer embrace with the fender-edges. To permit this action, the lock-bolt receiving hole in the fender bead may be formed as a slot, permitting slight upward movement of the shield.

In some cases, it may be desirable to avoid having the spring act directly to support the fender shield. In order to accomplish this, and at the same time to retain the effect of an upward bias on the fender shield, I may employ the arrangement shown at the left in Fig. 6. Essentially, this comprises a bolt 30 which is longitudinally slidable in brackets 31 and provided with a wedge-shaped outer end 32. This wedge end engages a fender-supported keeper 33 which has an inclined upper face; and when the bolt 30 is in projected or locked position it is urged forwardly by some spring means. As shown, this spring means comprises a curved leaf 34.

For operating this spring-pressed bolt arrangement I may use a crank 35 journaled in the shield 10 and preferably provided on its outer end with a head adapted to be operated by the same tool which will be used to demount a wheel or tire. This crank has an arm 38 at the end of which is connected one end of the spring 34. The other end of the spring 34 is connected to the end of the bolt 30. As shown, the bolt is in locked position and the spring 34 is stressed so that its reaction tends to project the bolt and also to turn the crank arm 38 in a clockwise direction against a stop 39. To release the bolt 31 the crank arm is turned in a counter-clockwise direction past a dead-center position and around to a point at the right of the crank shaft.

The arrangement which has just been described may be used in connection with a fixed arm such as the arm 16 shown in Figs. 2 to 5 inclusive. Or, instead, it may be used in connection with the device shown at the right in Fig. 6. Here a bolt 40 is loosely mounted for longitudinal sliding in a single bracket 41 on the shield 10. It too has a wedge-shaped end and co-operates with a fender-supported keeper 43 which has an inclined upper surface. The inner end of the bolt 40 is curved upwardly into an inverted U-shape and is attached to a second arm 48 on the crank shaft 35. The crank arm 48 is not spaced diametrically from the crank arm 38 but at an angle of about 150° thereto.

In its locked position, as shown in Fig. 6, the bolt 40 is stressed and its bending-stress-reaction is exerted on the keeper 43 tending to lift the shield 10, and also on the crank arm 48 tending to turn such crank arm in a clockwise direction against the stop 39. When this bolt 40 is to be unlocked, the crank arm 48 is turned in a counterclockwise direction. This movement tends to increase the stress on the bolt 40, although the retraction of the wedge-shaped end of the bolt down the inclined surface of the keeper 43 has a tendency to relieve the stress in the bolt. As the arm 48 continues its counterclockwise movement past a substantially vertical position, its end moves downwardly to relieve the stress of the bolt 40 and to pivot the bolt about the bracket 41 to raise its outer end. In order to permit this raising, the bracket 41 desirably embraces the bolt 40 only loosely.

Here again, this arrangement which has just been described may be used in association with a fixed arm such as that shown in Figs. 2 to 5 or may be used in the association shown in Fig. 6.

In any securing means which includes a rotatable crank, locking may be effected by associating the key-operated lock with the crank.

As is shown in Figs. 3 and 5, the fender edge which defines the wheel-exposing opening is rolled into an upwardly opening bead. This bead may be utilized and the necessity for fender-supported keepers avoided by the arrangement shown in Fig. 7. Here, the shield 10 is provided on its back with two brackets 50 through which pass the threaded ends of a U-shaped rod 51. The horizontal portion of this U-shaped rod is offset from the plane of the two vertical portions and is curved to mate with the fender bead. The threaded ends of the rods pass through springs 52 and are provided beyond such springs with wing nuts 53. In operation, this form of shield 10 is inserted upwardly into the wheel-exposing opening until the channel edge is brought into embracing engagement with the fender-bead, the generally horizontal portion of the rod 51 is then brought into engagement with the inside of such bead, and the wing nuts 53 tightened.

In Fig. 8 I have shown a modification of the spring lever of Figs. 2 to 5, in which the handle 22 is bent downwardly and outwardly beneath the lower edge of the shield so as to be accessible from the front of the shield. Instead of the arm holder 26, I provide a depression 55 in the face of the shield and bend the end of the arm 22 inward to form a finger 56 which is adapted to be received in the depression 55, to hold the arm 22 in locked position.

In Figs. 9 to 11 inclusive, I have shown three methods of securing the shield 10 in place by clamping its edges to the fender edges. In Fig. 9 the shield-edge is provided with a channel 57 which opens outwardly and forwardly to receive the fender-edge 58. On the back of the shield at spaced points along its edge are brackets 60 through which may be passed bolts 61. These bolts 61 pass through holes in the fender 11, and are desirably inclined so that upon tightening they exert both forward and upward force-components. Since the shield may be applied as an accessory, I may also provide in the ends of the brackets 60 a second hole 63 so that the shield may be used as a template for locating the holes in the fender 11.

In the modification illustrated in Fig. 10, the fender-bead is in the form of an inwardly extending flange, and the shield near its edge is rolled to form a forwardly opening groove 64 for receiving such fender-bead flange. The cooperation of these parts facilitates insertion of the shield in that the shield may be rested on the flange temporarily while the bolts are inserted.

Outwardly beyond the groove, the shield is provided with extensions by which it may be bolted to the fender, and these extensions may be in the form of a continuous flange 66 substantially coplanar with the body of the shield. At spaced points along this flange, it is provided with bolt holes which are surrounded by conical seats 67; and the fender has mating conical protrusions 68 which also serve as countersunk seats for the bolt heads 69. The mating conical seats 67 and protrusions 68 resist all relative movement in the plane of the shield, so that the bolts need only act in tension to hold the two parts together. The joint may be sealed, and noise eliminated, by inserting between the fender wall and the flange 66 of the shield a sealing cushion 65.

To avoid the necessity of drilling holes in the fender, I may use the arrangement shown in Fig. 11. Here again, the shield is provided with means for embracing the fender-edges on opposite sides. In this arrangement, this embrace is effected between a flange 70 at the edge of the shield 10 and a part 71 which may be either an annular band extending all along the curved edges of the shield 10, or may be a series of brackets. In either case, the part 71 may be secured at its inward portion to the shield 10 and is provided at its outer portion with a seat 72. Below such seat 72 and below the flange 70 of the shield 10 there is a spaced series of bolts 74 which may be tightened to draw the seat 72 toward the flange 70. Desirably, in this arrangement, there is interposed between the fender edge and the seat 72 and flange 70 a soft cushion 73 to compensate for variations in the parts and to eliminate noises.

It is noted that in the modifications of Figs. 9 to 11 inclusive the nuts for the bolts are held in cages 75 mounted on shield-supported parts and which permit slight lateral movement of the nuts so that they are self-alining, but prevent turning of the nuts so that it is unnecessary in mounting the shield to reach up behind it and hold such nuts from turning.

It is to be noted that my fender shield braces and strengthens the fender, in addition to its advantages in aiding the usual functions of the fender, and decreasing the wind resistance of the automobile. The various modifications of shield-securing means all have the advantage of securely holding the parts together without permitting looseness and noise, and yet all provide ready and simple removal and replacement of the shield. Since the shield prevents removal of the wheel or tire without previous removal of the shield itself, the key-locking of the shield in place effectively prevents surreptitious removal of such wheels and tire as well as of the shield itself.

The provision of edges on the shield which mate with the fender edges and press between themselves a sealing cushion which is continuous over substantially the whole length of the joint effectively seals the fender and shield against the escape of mud or water thrown up by the wheel; and this action is further accomplished by the fastening modifications of Figs. 2 to 5 and 8, which avoid the necessity for any openings through either the shield or fender.

It will be understood that the insert or closures for wheel-exposing openings may be used to cover the wheels of an automotive vehicle regardless of whether such vehicle has fenders of the present conventional shape. Thus, for instance, as in some busses, the body itself may extend over the wheels to form the fender, and the wheel-exposing opening will then be in the outer wall of such body. Accordingly, where I specify wheel-fenders in the appended claims, I mean to include any upper structure which acts as a wheel-fender, whether in the conventional fender form or in some other form, as where the body forms the fender.

The term "accessory" is intended to refer to a fender shield which may form part of the "standard equipment" of a vehicle or which may be supplied as extra equipment.

I claim as my invention:

1. An accessory for a wheel-fender having a depending outer wall in which there is a downwardly open wheel-exposing opening, comprising a shield for closing said opening, a peripheral wall on said shield adapted to overlap the opening-defining edge of said fender-wall, means at a plurality of points along the periphery of said shield for underlapping said opening-defining edge to confine said peripheral wall thereagainst, whereby said shield is adapted to be inserted by upward movement thereof in the plane of said edge, and means for securing said shield against relative vertical movement with respect to said fender.

2. An accessory for a wheel-fender having a depending outer wall in which there is a downwardly open wheel-exposing opening, comprising a shield for closing said opening, a peripheral wall on said shield adapted to overlap the opening-defining edge of said fender-wall, a second peripheral wall adapted to underlap said edge and co-operate with said first peripheral wall to confine said edge therebetween, whereby said shield is adapted to be inserted by upward movement thereof in the plane of said edge, and means for securing said shield against relative vertical movement with respect to said fender.

3. An accessory for a wheel-fender having a depending outer wall in which there is a downwardly open wheel-exposing opening, comprising a shield for closing said opening, a peripheral wall on said shield adapted to overlap the opening-defining edge of said fender-wall, means at a plurality of points along the periphery of said shield for underlapping said opening-defining edge to confine said peripheral wall thereagainst, whereby said shield is adapted to be inserted by upward movement thereof in the plane of the edge, and means for clamping said underlapping means and said peripheral wall together to secure said shield against relative vertical movement with respect to said fender.

4. An accessory for a wheel-fender having a depending outer wall in which there is a downwardly open wheel-exposing opening, comprising a shield for closing said opening, a channel on said shield which opens in a direction away from the center of the shield, said channel being shaped to receive the curved opening-defining edge of said fender to prevent relative movement between said edge and said shield in a direction normal to the plane of said edge, and means for vertically positioning said shield with respect to said fender with said channel in embracing engagement with said edge.

5. In combination with a wheel-fender having a depending outer wall in which there is a downwardly open wheel-exposing opening, a shield for closing said opening, a flange upstanding from the rear face of said shield in position to present its outer face in abutting relation to the opening-defining edge of said wall, inter-engaging means at a plurality of points along the contiguous portions of said flange and edge and engageable by upward movement of said shield for preventing relative lateral movement between said flange and edge, and releasable means for securing said shield upwardly with respect to said wall to hold said flange against said edge.

6. An accessory for a wheel-fender having a depending outer wall in which there is a downwardly open wheel-exposing opening, comprising a shield for closing said opening, means on said shield for upwardly abutting the opening-defining edge of said wall at a plurality of points therealong, means for interengaging said edge and engageable by upward movement of said shield for preventing relative lateral movement between said abutting means and said edge, and releasable means for securing said shield upwardly with respect to said wall to hold said abutting and interengaging means in operative position with respect to said edge.

7. An accessory for a wheel fender having a depending outer wall in which there is a downwardly open wheel-exposing opening, comprising a shield for closing said opening, means on said shield adapted by planar movement thereof to interengage said fender-wall at a plurality of points about the periphery of said opening therein to confine said shield in substantially the plane of said fender wall, and coacting means acting generally in the direction of the plane of said shield and wall for vertically positioning said shield with respect to said fender.

8. An accessory for a wheel fender having a depending outer wall in which there is a downwardly open wheel-exposing opening, comprising a shield for closing said opening, an integral peripheral wall on said shield adapted to overlap the opening defining edge of said fender wall, said wall being formed of shield material turned back upon itself to the base of said wall, a second wall upstanding from said shield, said shield material being turned inwardly from the base of said peripheral wall to form said upstanding wall, and a flange at the free edge of said upstanding wall for underlapping said opening-defining edge to confine said peripheral wall thereagainst, whereby said shield is adapted to be inserted by upward movement thereof in the plane of said edge, said shield material being turned outwardly to form said flange, and means for securing said shield against relative vertical movement with respect to said fender.

9. An accessory for a wheel fender having a depending outer wall in which there is a downwardly open wheel-exposing opening, comprising a shield for closing said opening, means on said shield adapted by planar movement thereof to interengage the edge of said fender wall at a plurality of points about the periphery of said opening therein to confine said shield in substantially the plane of said fender wall, and coacting means located on the inside of said shield and acting generally in the direction of the plane of said shield and wall for exerting an upward pressure on said shield and maintaining it in engagement with said edge.

10. An accessory for a wheel fender having a depending outer wall in which there is a downwardly open wheel-exposing opening, comprising a shield for closing said opening, means on said shield adapted to interengage the peripheral edge of said fender-wall at a plurality of points thereabout to confine the shield in substantially the plane of said wall, and means for exerting an upward pressure on said shield and maintaining it in engagement with said edge.

11. An accessory for a wheel fender having a depending outer wall in which there is a downwardly opening wheel exposing opening, comprising a shield for said opening, means on said shield adapted by planar movement of said shield to interengage the edge of said fender wall at a plurality of points about the periphery of said opening therein to confine said shield in substantially the plane of said fender wall, and a single pair of angularly spaced devices acting generally in the plane of said shield and wall for exerting an upward pressure on said shield and maintaining it in engagement with said edge.

12. An accessory for a wheel fender having a depending outer wall in which there is a downwardly opening wheel exposing opening, comprising a shield for said opening, means on said shield adapted by planar movement of said shield to interengage the edge of said fender wall at a plurality of points about the periphery of said opening therein to confine said shield in substantially the plane of said fender wall, and means acting generally radially of said shield and edge for maintaining said shield in engagement with said edge.

13. An accessory for a wheel fender having a depending outer wall in which there is a downwardly open wheel-exposing opening, comprising a shield for closing said opening, means on said shield adapted to interengage the peripheral edge of said fender-wall at a plurality of points thereabout to confine the shield in substantially the plane of said wall, a lug supported on said shield and means supported by said lug for fastening said shield in place.

14. An accessory for a wheel fender having a depending outer wall in which there is a downwardly opening wheel-exposing opening, comprising a shield for said opening, means on said shield adapted by planar movement of said shield to interengage the edge of said fender wall at a plurality of points about the periphery of said opening therein to confine said shield in substantially the plane of said fender wall, a lug supported on said shield and means supported by said lug for fastening said shield in place.

15. In combination with a wheel-fender having a depending outer wall in which there is a downwardly open wheel-exposing opening defined by an in-turned edge having an inner surface of considerable width and curved in substantially a single plane, a shield for closing said opening, a wall upstanding from the rear face of said shield providing an outer surface similar in shape to said inner surface, said wall being positioned to present such outer surface in abutting relation to said inner surface, inter-engaging means at a plurality of points along the contiguous portions of said in-turned edge and upstanding-wall and engageable by upward movement of said shield for preventing relative lateral movement between said edge and wall, and releasable means for securing said shield upwardly with respect to said fender wall to hold said outer wall-face toward said inner edge surface.

JULES HALTENBERGER.